(12) United States Patent
Saito et al.

(10) Patent No.: US 6,604,430 B2
(45) Date of Patent: Aug. 12, 2003

(54) PRESSURE SENSOR AND PRESSURE SENSOR HOUSING HAVING A PROTECTIVE PORTION

(75) Inventors: Kazunori Saito, Nagano (JP); Kimihiro Ashino, Nagano (JP); Katsumichi Ueyanagi, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/121,432

(22) Filed: Apr. 12, 2002

(65) Prior Publication Data

US 2002/0178829 A1 Dec. 5, 2002

(30) Foreign Application Priority Data

Apr. 12, 2001 (JP) ........................................ 2001-114329

(51) Int. Cl.[7] ................................................. G01L 7/00
(52) U.S. Cl. ........................................................ 73/756
(58) Field of Search ............................. 73/706, 715, 716, 73/717, 723, 725, 756

(56) References Cited

U.S. PATENT DOCUMENTS 4,546,785 A * 10/1985 Sanderford .................. 137/85
4,682,499 A * 7/1987 Baker .......................... 73/701
5,307,684 A * 5/1994 Moss et al. .................. 73/716
5,583,294 A * 12/1996 Karas .......................... 73/706
5,602,338 A * 2/1997 Tamai et al. ................. 73/716
6,131,467 A * 10/2000 Miyano et al. .............. 73/756

FOREIGN PATENT DOCUMENTS

JP        63-175736        7/1988

* cited by examiner

*Primary Examiner*—William Oen
(74) *Attorney, Agent, or Firm*—Rossi & Associates

(57) ABSTRACT

A semiconductor pressure sensor chip is housed in a pressure detecting chamber, and a pressure port is provided which causes the pressure detecting chamber and a space in which pressure is to be measured are in communication with each other. A protective portion is provided inside the pressure port in such a manner as to substantially close an inlet of the pressure detecting chamber in the state in which the pressure detecting chamber and the space in which pressure is to be measured are in communication with each other. This prevents degraded and solidified foreign matter such as oil and gasoline, which are led into the pressure port from the space in which pressure is to be measured, from entering the pressure detecting chamber and colliding with the sensor element and the like.

4 Claims, 5 Drawing Sheets

PRESSURE SENSOR AND PRESSURE SENSOR HOUSING HAVING A PROTECTIVE PORTION

FIELD OF THE INVENTION

The present invention relates to a pressure sensor that converts pressure into an electric signal and outputs it, and a pressure sensor housing for housing the pressure sensor. In particular, the present invention relates to a pressure sensor that is suitably applied to automobiles and the like, and a pressure sensor housing for housing the pressure sensor.

BACKGROUND OF THE INVENTION

Generally, a semiconductor sensor chip based on the piezo resistance effect is employed in a pressure sensor for use in automobiles. The semiconductor pressure sensor is constructed such that a plurality of semiconductor distortion gages made of materials producing the piezo resistance effect are connected together to form a bridge circuit on a diaphragm formed of single crystal silicon or the like. If the diaphragm is deformed due to a change in pressure, the resistance of the semiconductor distortion gages varies according to the change in pressure. The change in resistance is withdrawn as a voltage signal from the bridge circuit.

FIG. 4 shows the exterior of the above-described conventional pressure sensor, and FIG. 5 is a sectional view taken along line V—V in FIG. 4. The pressure sensor is constructed such that a semiconductor sensor chip 13 is housed in a concave sensor mount portion 12 formed in a housing body 11, and a pressure port 14 is attached to the housing body 11. The semiconductor pressure sensor chip 13 is electrically connected to a lead terminal (lead frame) 15, which is used for conduction to external devices and is inserted into and integrated with the housing body 11, via a bonding wire 16. The pressure sensor includes a gel protective portion 17 that protects the surface of the semiconductor pressure sensor chip 13 and the bonding wire 16 from contaminated substances included in a medium whose pressure is to be measured. A space between the housing body 11 and the base of the pressure port 14 serves as a pressure detecting chamber 18.

In the pressure sensor constructed in the above-mentioned manner, however, the part of the gel protective member 17, which covers the semiconductor pressure sensor chip 13, is exposed into the pressure port 14. Therefore, degraded and solidified foreign matter such as oil and gasoline included in the medium to be measured may enter the pressure detecting chamber 18 via the pressure port 14 to directly collide with the gel protective member 17. If the foreign matter collides with the gel protective member 17, the impact of the collision is transmitted to the semiconductor pressure sensor chip 13 to cause the deformation amount of the diaphragm to deviate from accuracy. This results in inaccurate measurement of pressure.

Therefore, it would be desirable to provide a pressure sensor that is capable of preventing foreign matter included in a medium to be measured from entering a pressure detecting chamber housing a sensor element that converts pressure into an electric signal so as to eliminate the adversary effect caused by collision of the foreign matter with the sensor element or the like and enable accurate measurement of pressure. It would further be desirable to provide a pressure sensor housing that is capable of preventing foreign matter from entering a pressure detecting chamber housing a sensor element that converts pressure into an electric signal.

SUMMARY OF THE INVENTION

In accordance with the present invention, a pressure sensor is provided which includes a sensor element that converts pressure into an electric signal, a pressure detecting chamber that houses the sensor element, a pressure port that allows communication of the pressure detecting chamber and a space in which pressure is to be measured, and a protective portion provided inside the pressure port in such a position as to substantially close an inlet of the pressure detecting chamber in the state in which the pressure detecting chamber and the space in which pressure is to be measured are in communication with each other. According to the present invention, the protective portion provided inside the pressure port substantially closes the inlet of the pressure detecting chamber housing the pressure sensor element in the state in which the pressure detecting chamber and the space in which pressure is to be measured are communication with each other. Therefore, the protective portion prevents foreign matter from entering the pressure detecting chamber

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENTS

Embodiments of the present invention will now be described in detail with reference to the drawings.

First Embodiment

Figure 1:
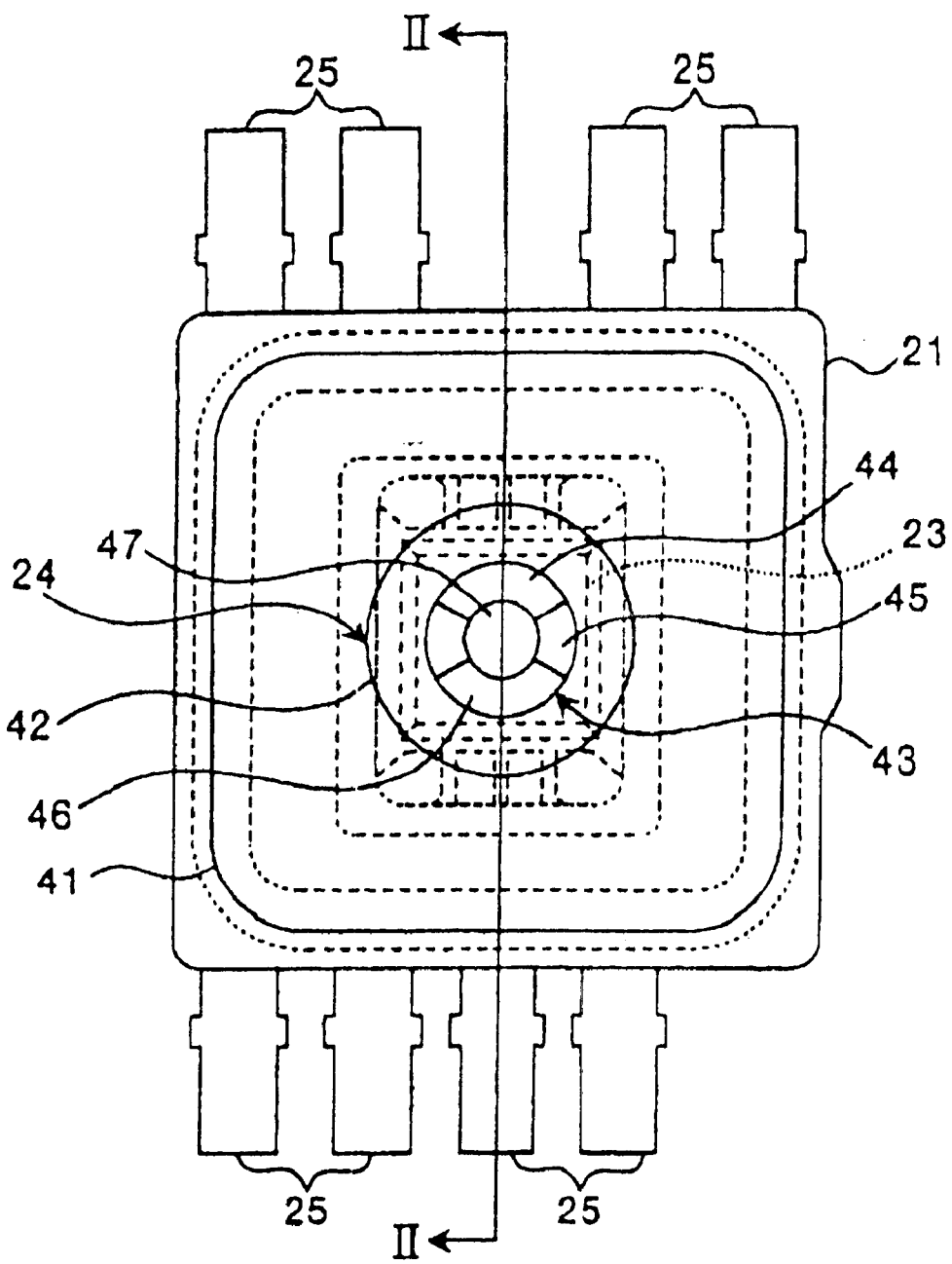
FIG. 1 shows the exterior of a pressure sensor according to the first embodiment of the present invention.
Figure 2:
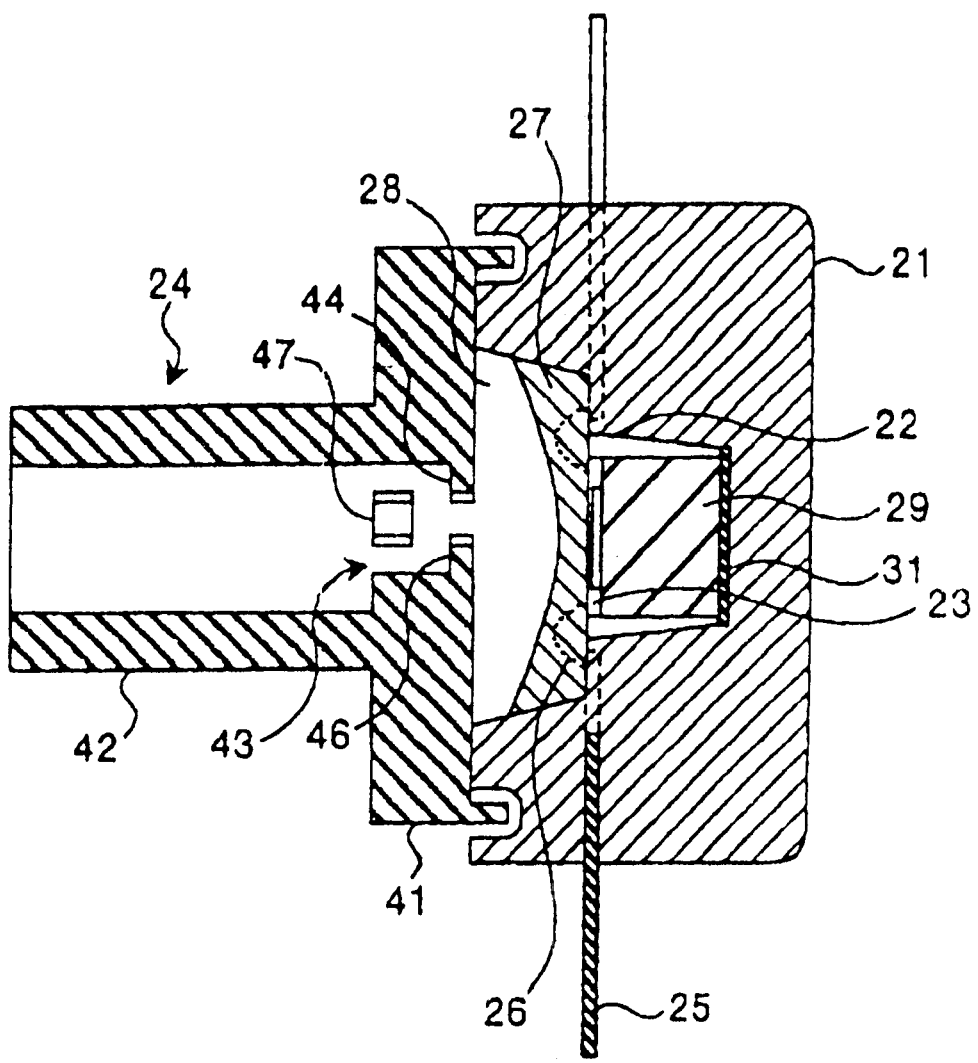
FIG. 2 is a sectional view taken along line II—II of FIG. 1.

FIG. 1 shows the exterior of a pressure sensor according to the first embodiment of the present invention, and FIG. 2 is a sectional view taken along line II—II in FIG. 1. The pressure sensor according to the present embodiment is constructed such that a glass base 29 mounting thereon a semiconductor pressure sensor chip 23 as a sensor element is fixed on a sensor mount portion 22 of a housing body 21 made of resin by an adhesive agent 31 or the like. The sensor chip 23 and a lead terminal (lead frame) 25 are electrically connected to each other via a bonding wire 26, and a gel protective member 27 is provided which protects the surface of the sensor chip 23 and the bonding wire 26. A pressure port 24 is adhered to the housing body 21 to form a pressure detecting chamber 28.

The pressure port 24 is comprised of a base portion 41 that is joined to the pressure body 21, and a cylindrical portion 42 through which a medium to be measured is introduced. A protective portion 43 is formed inside the cylindrical portion 42 so as to substantially close an inlet of the pressure detecting chamber 28 in the state in which the pressure detecting chamber 28 and a space inside the cylindrical portion 42 are in communication with each other. The space inside the cylindrical portion 42 communicates with a space in which pressure is to be measured (not illustrated).

The protective portion 43 is preferably comprised of four projecting portions 44, 45, 46, 47 projecting into the cylindrical portion 42, as shown in FIGS. 1 and 2. These four projective portions 44, 45, 46, 47 are situated along the axis of the cylindrical portion 42. The projecting portions 44, 45, 46, 47 are arranged at such positions as to make the pressure detecting chamber 28 unseen substantially or completely in the case where the inside of the cylindrical portion 42 is viewed from the opposite side of the base 42 (at the left side in FIG. 2). It should be noted that the protective portion 43 may be comprised of two, three, five or more projecting portions.

According to the above-described embodiment 1, the inlet of the pressure detecting chamber 28 is substantially closed by the four projecting portions 44, 45, 46, 47 constituting the protective portion 43. Therefore, even if degraded and solidified foreign matter such as oil and gasoline are led into the pressure port 24 from the space in which pressure is to be measured, the foreign matter collide with the protective portion 43 to avoid direct collision with the sensor element or the like. This enables accurate measurement of pressure and prevents deterioration of the characteristics of the sensor element in terms of reliability.

Second Embodiment

Figure 3:
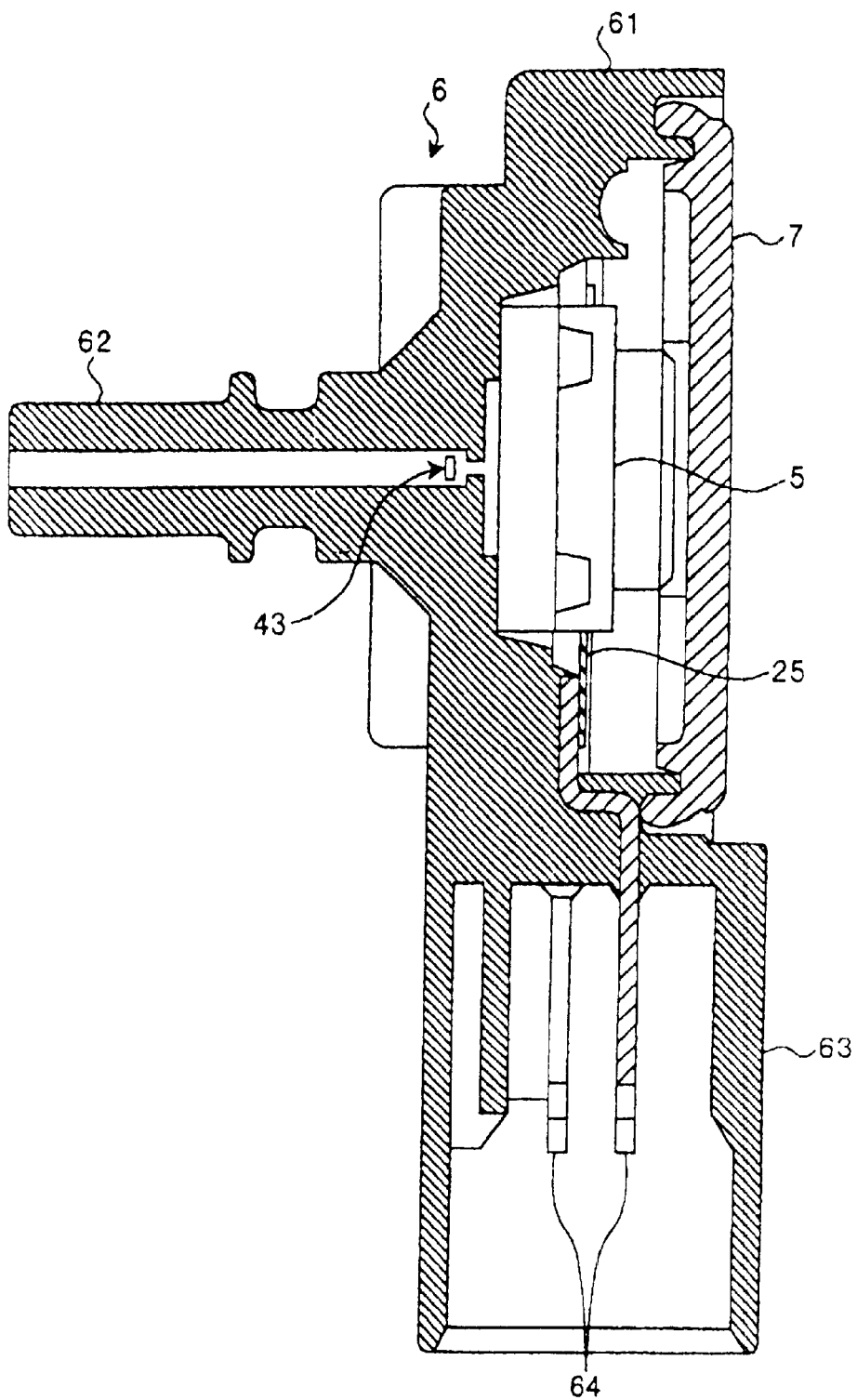
FIG. 3 shows the exterior of a pressure sensor according to the second embodiment of the present invention.
Figure 4:
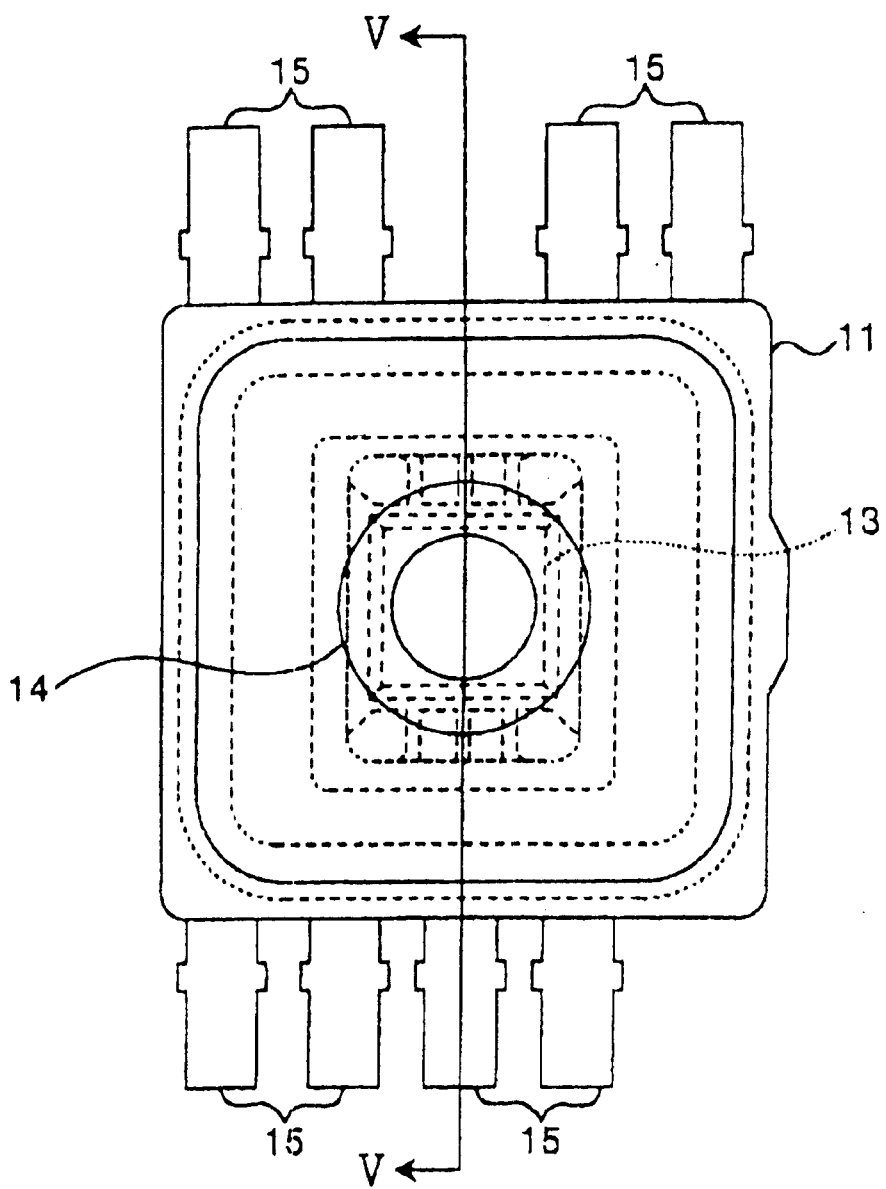
FIG. 4 shows the exterior of a conventional pressure sensor.
Figure 5:
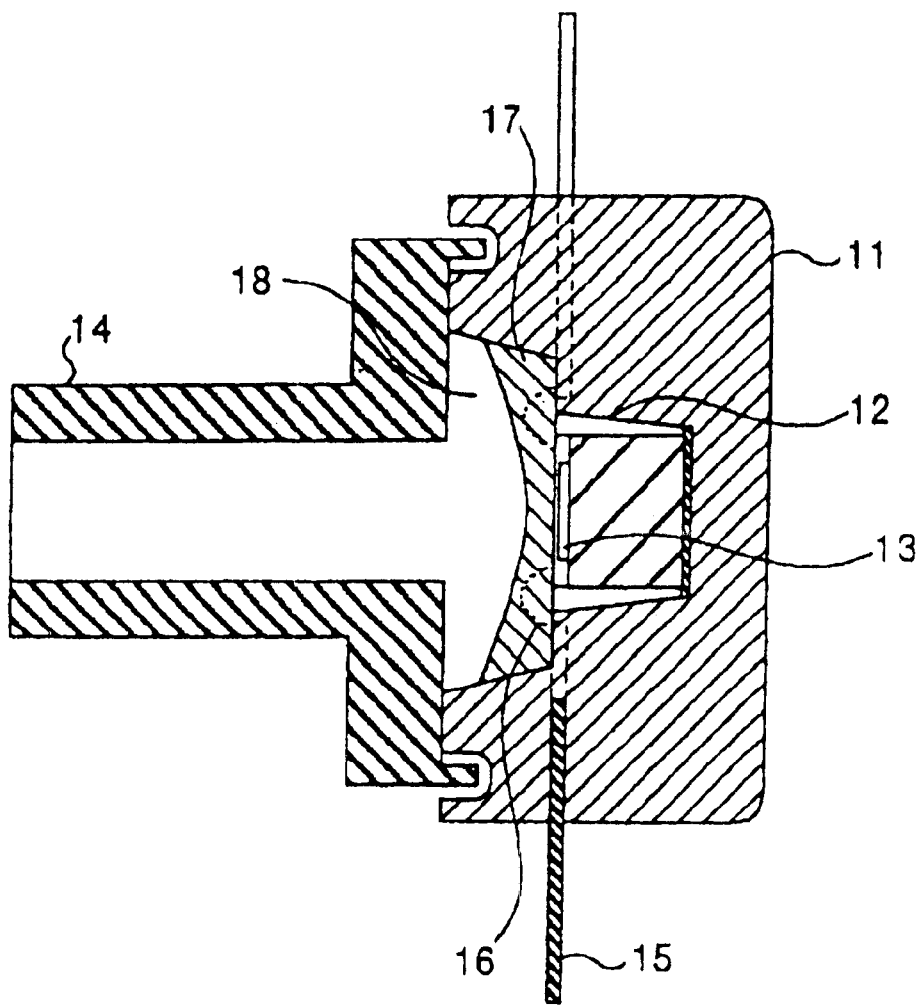
FIG. 5 is a sectional view taken along line V—V of FIG. 4.

FIG. 3 is a sectional view showing a pressure sensor according to the second embodiment of the present invention. The pressure sensor according to the second embodiment may be directly mounted in an engine of an automobile and the like. In the pressure sensor according to the present embodiment, a housing 6 comprised of a base portion 61 that houses a pressure sensor unit 5 and a cylindrical portion 62 for introduction of a medium to be measured is employed in place of the pressure port 24 in the first embodiment. The cylindrical portion 62 is constructed in the same manner as in the first embodiment, and namely, the cylindrical portion 62 is provided with the protective portion 43 which is preferably comprised of the four projecting portions 44, 45, 46, 47, for example. It should be noted that parts and elements of the second embodiment corresponding to those of the first embodiment are denoted by the same reference numerals, and a description thereof is omitted herein. A housing cap 7 is adhered and fixed to the base 61 of the housing 6 from the opposite side of the cylindrical portion 62.

The pressure sensor unit 5 is constructed such that the pressure port 24 is omitted from the pressure sensor according to the first embodiment. Specifically, the pressure sensor unit 5 is constructed such that the semiconductor pressure sensor chip 23 is fixed in the pressure body 21 via the glass base 29, the sensor chip 23 and the lead terminal 25 are connected to each other via the bonding wire 26, and there is provided the gel protective member 27 (refer to FIG. 2). Although not illustrated in the drawings, the pressure detecting chamber according to the second embodiment corresponds to a space that is enclosed by the pressure sensor unit 5 and the base 61 of the housing 6. The housing 6 is further comprised of a connector portion 63 having a terminal 64. The terminal 64 is inserted into the base 61 of the housing 6 and is welded to the lead terminal 25 of the pressure sensor unit 5, which is used to take out signals.

According to the above-described second embodiment, the protective portion 43 substantially closes the inlet of the pressure detecting chamber. Therefore, even if degraded and solidified foreign matter such as oil and gasoline enter the cylindrical portion 62 of the housing 6, the foreign matter collide with the protective portion 43 to avoid direct collision with the sensor element or the like. This enables accurate measurement of pressure, and prevents deterioration of the characteristics of the sensor element in terms of reliability.

It goes without saying that there is no intention to limit the invention to the above-described embodiments, but the invention is to cover all modifications falling within the spirit and scope of the invention insofar as the pressure sensor is constructed such that the foreign matter introduced from the space in which pressure is to be measured can be prevented from entering the pressure detecting chamber in the state in which the pressure detecting chamber and the space in which pressure is to be measured are in communication with each other for measurement of the pressure in the space.

According to the present invention, the protective portion provided inside the pressure port substantially closes the inlet of the pressure detecting chamber that houses the pressure sensor element. Therefore, even if foreign matter included in the medium to be measured is led into the pressure port, the protective portion inhibits the foreign matter from entering the pressure detecting chamber. This enables accurate measurement of pressure, and prevents deterioration of the characteristics of the sensor element in terms of reliability.

What is claimed is:

1. A pressure sensor comprising:

a sensor element that converts pressure into an electric signal;

a pressure detecting chamber that houses said sensor element;

a pressure port that allows communication of said pressure detecting chamber and a space in which pressure is to be measured; and a protective portion that is provided inside said pressure port in such a position as to substantially close an inlet of said pressure detecting chamber in a state in which said pressure detecting chamber and the space in which pressure is to be measured are in communication with each other.

2. A pressure sensor according to claim 1, wherein said pressure port and said protective portion are integrated with each other by resin.

3. A pressure sensor housing comprising:

a pressure detecting chamber that houses a sensor element which converts pressure into an electric signal;

a pressure port that allows communication of said pressure detecting chamber and a space in which pressure is to be measured; and a protective portion that is provided inside said pressure port in such a position as to substantially close an inlet of said pressure detecting chamber in a state in which said pressure detecting chamber and the space in which pressure is to be measured are in communication with each other.

4. A pressure sensor according to claim 3, wherein said pressure port and said protective portion are integrated with each other by resin.

* * * * *

UNITED STATES PATENT AND TRADEMARK OFFICE
CERTIFICATE OF CORRECTION

PATENT NO.     : 6,604,430 B2
DATED          : August 12, 2003
INVENTOR(S)    : Kazunori Saito et al.

It is certified that error appears in the above-identified patent and that said Letters Patent is hereby corrected as shown below:

<u>Title page,</u>
Item [54], Title, following "PROTECTIVE PORTION", please insert -- ADJACENT TO A PRESSURE CHAMBER --.

Signed and Sealed this

Twenty-third Day of December, 2003

JAMES E. ROGAN
*Director of the United States Patent and Trademark Office*